(12) United States Patent
Yoshimura et al.

(10) Patent No.: US 12,537,146 B2
(45) Date of Patent: Jan. 27, 2026

(54) FILM FORMING DEVICE, MANUFACTURING METHOD OF ELECTRODE FOIL FOR ELECTROLYTIC CAPACITOR, AND MANUFACTURING METHOD FOR ELECTROLYTIC CAPACITOR

(71) Applicant: Panasonic Intellectual Property Management Co., Ltd., Osaka (JP)

(72) Inventors: Mitsuhisa Yoshimura, Osaka Fu (JP); Naomi Kurihara, Osaka Fu (JP); Miwa Ogawa, Osaka Fu (JP); Akihiro Yamaguchi, Nara Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 24 days.

(21) Appl. No.: 18/246,091

(22) PCT Filed: Sep. 27, 2021

(86) PCT No.: PCT/JP2021/035370
§ 371 (c)(1),
(2) Date: Mar. 21, 2023

(87) PCT Pub. No.: WO2022/071221
PCT Pub. Date: Apr. 7, 2022

(65) Prior Publication Data
US 2023/0360864 A1 Nov. 9, 2023

(30) Foreign Application Priority Data
Sep. 30, 2020 (JP) .................................. 2020-166131

(51) Int. Cl.
*H01G 13/00* (2013.01)
*H01G 9/00* (2006.01)
*H01G 9/07* (2006.01)

(52) U.S. Cl.
CPC ............ *H01G 13/00* (2013.01); *H01G 9/0032* (2013.01); *H01G 9/07* (2013.01)

(58) Field of Classification Search
None
See application file for complete search history.

(56) References Cited

U.S. PATENT DOCUMENTS 10,214,813 B2    2/2019  Keto
2011/0311883 A1* 12/2011  Oukassi ................. H01M 6/18
                                                216/13

(Continued)

FOREIGN PATENT DOCUMENTS

JP    H07-201684 A    8/1995
JP    2007-184301 A   7/2007

(Continued)

OTHER PUBLICATIONS

International Search Report dated Dec. 14, 2021 issued in International Patent Application No. PCT/JP2021/035370, with English translation.

*Primary Examiner* — Joshua L Allen
*Assistant Examiner* — Bradford M Gates
(74) *Attorney, Agent, or Firm* — Rimon P.C.

(57) ABSTRACT

A film-forming device disclosed is a film-forming device for forming a film on a metal foil having a porous portion on a main surface thereof by a gas phase method, and includes a film-forming region in which the film is formed on the metal foil, conveyors to provided downstream of the film-forming region and drawing the metal foil from the film-forming region, and a control unit that controls the stress applied to the metal foil from the conveyors to 21 N/mm² or less. This (Continued)

provides a film-forming device which does not cause defects easily on a film-forming target metal foil.

12 Claims, 3 Drawing Sheets

(56) References Cited

U.S. PATENT DOCUMENTS

| | | |
|---|---|---|
| 2016/0322171 A1 | 11/2016 | Saeki et al. |
| 2017/0040115 A1 | 2/2017 | Taira et al. |
| 2021/0087690 A1* | 3/2021 | Shingaki ................ C23C 16/34 |
| 2021/0193996 A1* | 6/2021 | Laramie .............. H01M 4/0428 |
| 2022/0115185 A1 | 4/2022 | Kurihara et al. |

FOREIGN PATENT DOCUMENTS

| | | |
|---|---|---|
| WO | 2015/098644 A1 | 7/2015 |
| WO | 2015/118902 A1 | 8/2015 |
| WO | 2020/171114 A1 | 8/2020 |

* cited by examiner

FILM FORMING DEVICE, MANUFACTURING METHOD OF ELECTRODE FOIL FOR ELECTROLYTIC CAPACITOR, AND MANUFACTURING METHOD FOR ELECTROLYTIC CAPACITOR

CROSS-REFERENCE OF RELATED APPLICATIONS

This application is the U.S. National Phase under 35 U.S.C. § 371 of International Patent Application No. PCT/JP2021/035370, filed on Sep. 27, 2021, which in turn claims the benefit of Japanese Patent Application No. 2020-166131, filed on Sep. 30, 2020, the entire disclosures of which Applications are incorporated by reference herein.

TECHNICAL FIELD

The present disclosure relates to a film-forming device, a method for producing an electrode foil for an electrolytic capacitor, and a method for producing an electrolytic capacitor.

BACKGROUND ART

Conventionally, as a method for producing an electrode foil for an electrolytic capacitor, a method in which a metal foil is subjected to anodization in an anodizing solution has been known. For example, Patent Literature 1 has proposed a method for producing an electrode foil for an electrolytic capacitor: in the method, an electrode foil for an electrolytic capacitor is produced by subjecting an aluminum etching foil to anodization, and when electrode foil produced by subjecting the etching foil to anodization and dried is subjected to re-anodization, the electrode foil is immersed in an acid solution, and then re-anodization is performed.

Meanwhile, a film-forming device for forming a film on a substrate using an atomic layer deposition (ALD) method has been known (e.g., Patent Literature 2). The film-forming device of Patent Literature 2 includes a first roller that sends a substrate before forming a film, a second roller that takes up the substrate after the film is formed, and a support structure that supports the substrate conveyed from the first roller to the second roller. The film-forming device of Patent Literature 1 further includes a web that is interposed between the substrate and the support structure, and the web prevents direct contact between the substrate and the support structure.

CITATION LIST

Patent Literature

Patent Literature 1: Japanese Unexamined Patent Publication No. 2007-184301
Patent Literature 2: U.S. patent Ser. No. 10/214,813

SUMMARY OF INVENTION

Technical Problem

A film-forming device that forms a film on a metal foil having a porous portion on a main surface thereof by a gas phase method tends to cause defects such as cracks or voids on the metal foil. Particularly, between the latter half of the film forming to taking up of the metal foil, the metal foil tends to have defects such as cracks or voids. With the conventional method in which a metal foil is subjected to anodization in an anodizing solution, as in Patent Literature 1, defects such as voids or cracks can be repaired. Meanwhile, when a film is formed on a metal foil by a gas phase method, it is difficult to repair such defects. Under such circumstances, one of the purposes of the present disclosure is to provide a film-forming device that does not cause defects easily to a film-formation target, i.e., metal foil.

Solution to Problem

An aspect of the present disclosure relates to a film-forming device for forming a film on a metal foil having a porous portion on a main surface thereof by a gas phase method. The film-forming device includes a film-forming region where the film is formed on the metal foil, a conveyor provided downstream of the film-forming region and drawing the metal foil from the film-forming region, and a control unit that controls a stress applied to the metal foil from the conveyor to 21 N/mm² or less.

Effect of Invention

The present disclosure allows for a film-forming device that does not easily cause defects on a film-formation target, i.e., metal foil.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
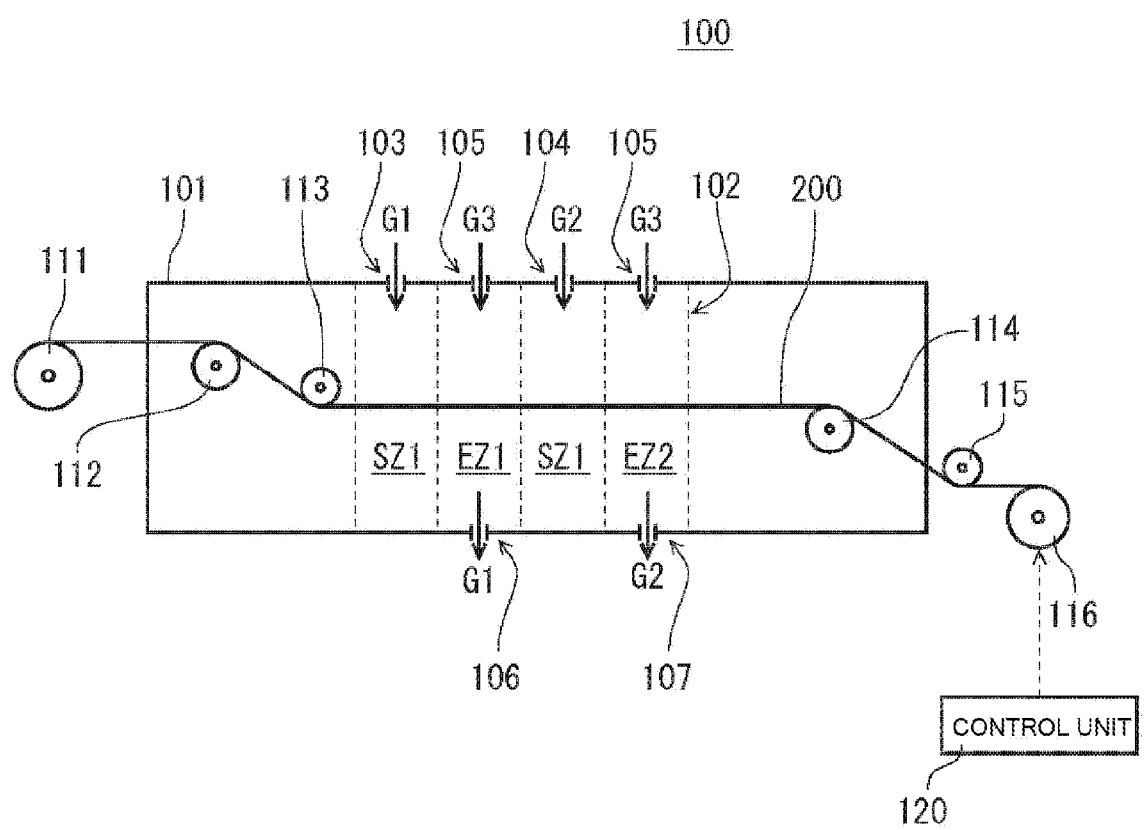
FIG. 1 is a front view schematically illustrating a film-forming device of Embodiment 1.

Hereinafter, an exemplary embodiment of a film-forming device in accordance with the present disclosure is described. However, the present disclosure is not limited to examples described below. In the following description, specific numerical values and materials may be exemplified, but other numerical values and other materials may be used as long as the effect of the present disclosure is obtained.
(Film-Forming Device)
A film-forming device of the present disclosure includes a film-forming region, a conveyor, and a control unit. In the following, they are described.
(Film-Forming Region)
In the film-forming region, a film is formed on a metal foil having a porous portion on a main surface thereof by a gas phase method. The porous portion may be provided on only one main surface, or may be provided on both main surfaces. The film is formed, for example, while the metal foil having a porous portion on a main surface thereof is continuously conveyed through a film-forming region by a roll-to-roll method. The film-forming region may include a first supply zone in which a first gas is supplied, a first exhaust zone in which the first gas is purged, a second supply zone in which a second gas is supplied, and a second exhaust zone in which the second gas is purged. However, the configuration of the film-forming region is not limited to this.

The metal foil may include a first metal. The type of the first metal is not particularly limited. The first metal may be valve metals such as aluminum, tantalum, and niobium, or an alloy containing valve metals, because of easy film formation. The metal foil has a thickness of, without particular limitation, for example, 10 μm or more and 300 μm or less, or particularly 15 μm or more and 250 μm or less. The purity of the metal foil is not particularly limited, and for example, 99% or more and 99.99% or less.

The first gas may include a second metal. The first gas may include a precursor containing the second metal in a gas state. The type of the second metal is not particularly limited. Examples of the second metal include aluminum, tantalum, niobium, silicon, titanium, zirconium, and hafnium. These may be used singly or in combination of two or more. Preferably, the first gas contains an inert gas such as nitrogen and argon as a carrier gas.

The second gas may include an inert gas and an oxidizer. The inert gas may be, for example, nitrogen or argon. The oxidizer may be, for example, water, oxygen, ozone, hydrogen peroxide, or carbon dioxide. For the second gas, a plasma gas may be used. For the plasma, oxygen, nitrogen, ozone, carbon dioxide, or a combination of two or more of these may be used.

(Conveyor)

The conveyor is provided downstream of the film-forming region, and draws the metal foil from the film-forming region. The conveyor may be, for example, a conveyor roller having a motor. Such a conveyor roller may be a take-up roller that takes up a metal foil after film formation, or a roller other than the take-up roller positioned upstream of the take-up roller. However, the conveyor configuration is not limited to these.

(Control Unit)

The control unit controls the stress applied to the metal foil from the conveyor to 21 N/mm$^2$ or less. The control unit may control a plurality of conveyors, or may control only the conveyor that applies the maximum stress. The stress applied to the metal foil may be the maximum at a contact portion with the take-up roller or its vicinity, or at a place somewhere else, according to how the control unit takes control. By controlling the maximum stress applied to the metal foil to 21 N/mm$^2$ or less, the metal foil of the film-formation target may have fewer defects. The control unit may control, for example, the stress applied to the metal foil from the conveyor by controlling the power of the conveyor. Alternatively, the control unit may control the stress applied to the metal foil from the conveyor by controlling the position of the conveyor. The control by the control unit is not limited to these.

During film formation, a film is formed by spraying film forming materials such as a first gas and a second gas to the metal foil, and therefore when the stress (or tension) applied to the metal foil is too low, the metal foil may go through swinging or loosening during the film formation, which may damage the stability of the position of the metal foil. When the first gas is sprayed over the metal foil along with the carrier gas, the position control of the metal foil is more important. Control over the positional relation between the film-forming material and the metal foil may affect the film quality, and therefore preferably, the conveyor stress immediately after the film-formation or near the film-forming region is set high in the range of 21 N/mm$^2$ or less, to control swinging of the metal foil due to the film formation.

In this specification, the "stress" means a value obtained by dividing the tension (unit: N) applied to the metal foil from the conveyor by crossing area (unit: mm$^2$) of the metal foil. That is, when the "stress" is mentioned in this specification, it does not mean a partial maximum stress value at any crossing face of the metal foil, but means an overall average stress value at the crossing face. The "maximum stress" mentioned in the previous paragraph means a maximum average stress value when the average stress value changes in the metal foil length direction.

As described above, the present disclosure achieves obtaining a film-forming device that does not easily cause defects in a film-formation target metal foil or film. Particularly, with the present disclosure, defects to the metal foil can be effectively suppressed during the latter half of the film formation to the taking up of the metal foil.

Furthermore, to improve an electrostatic capacitance of the electrode foil, when the surface area of the porous portion is increased or the thickness of the porous portion is increased, when forming a film, it accelerates generation of cracks or voids, and mechanically stable conveyance of the electrode foil at the time of film formation is difficult. Meanwhile, the present disclosure can provide a high performance and stable quality electrode foil with which defects are not easily caused in the film-formation target metal foil, and also the metal foil can be stably run.

Furthermore, in the electrode foil after film formation, cracks or voids are hardly generated in the film, and a high performance and stable quality electrode foil can be provided.

The thickness of the porous portion may be 5 μm or more, or 20 μm or more. The thickness of 5 μm or more is suitable when the metal foil is used as a cathode foil, and the thickness of 20 μm or more is suitable when the metal foil is used as an anode foil. As described, even when a relatively thick porous portion is included in the metal foil, with the film-forming device of the present disclosure, defects are not easily caused in the metal foil.

The metal foil may have a core part that is continuous to the porous portion, and the core part may have a thickness of 10 μm or more. Even when a relatively thick core part is included in the metal foil, with the film-forming device of the present disclosure, defects are not easily generated in the metal foil.

The film may include a dielectric. The film may include, as a dielectric, for example, $Al_2O_3$, $Ta_2O_5$, $Nb_2O_5$, $SiO_2$, $ZrO_2$, or $HfO_2$ singly, or may include two or more of these in combination. However, the type of the dielectric is not limited to these.

The film may have a thickness of 2 nm or more. Furthermore, the film may have a thickness of 7 nm or more. The film with a thickness of 7 nm or more is particularly suitable when the electrode foil is used as an anode foil.

Preferably, the conveyor is a columnar or cylindrical roller. In the present disclosure, the columnar or cylindrical roller includes, for example, a drum-like roller with the diameter of the columnar or cylindrical roller partly changed, a roller of columnar or cylindrical roller with vertical and/or horizontal slits, and a helical roller of columnar or cylindrical roller with slits in a diagonal direction. Also, an air turn roller cylinder, with which the columnar or cylindrical roller and metal foil makes no contact, is considered as the columnar or cylindrical roller. Preferably, the roller has a diameter of 30 mm or more. The roller diameter may be 50 mm or more, in accordance with the thickness of the film to be formed. For example, when the thickness of a film to be formed is 7 nm or more, preferably, the roller diameter is 50 mm or more. The roller diameter may be 70 mm or more, in accordance with the place to be installed. For example, a roller to be installed downstream of the film-forming region such as a take-up roller preferably has a diameter of 70 mm or more.

The gas phase method may be an atomic layer deposition method. The gas phase method may be any other gas phase method, such as physical vapor deposition, chemical vapor deposition, etc.

(Method for Producing Electrode Foil for Electrolytic Capacitor)

The method for producing an electrode foil for an electrolytic capacitor of the present disclosure includes a step of preparing a metal foil having a porous portion on a main surface thereof, and a step of forming a film on the metal foil using the above-described film-forming device. An electrode foil for an electrolytic capacitor with fewer defects on the film can be produced in this manner (Method for Producing Electrolytic Capacitor)

The method for producing an electrode foil for an electrolytic capacitor of the present disclosure includes a step of preparing a metal foil having a porous portion on a main surface thereof, and a step of forming a film on the metal foil using the above-described film-forming device to obtain an electrode foil, and forming a solid electrolyte layer covering at least a portion of the film. An electrolytic capacitor including an electrode foil having a film with fewer defects can be produced in this manner.

Next, an example of the film-forming device of the present disclosure will be described in detail with reference to the drawings. The above-described components can be applied to the components of the exemplary film-forming device described in the following. The components of the exemplary film-forming device described in the following can be changed based on the description above. Further, the items described in the following may be applied to the above-described embodiments. Of the exemplary components of the film-forming device described in the following, those components not essential for the film-forming device of the present disclosure can be omitted. The figures shown below are schematic, and do not accurately represent the shapes and numbers of the actual member.

Embodiment 1

A film-forming device 100 of Embodiment 1, and a method for producing an electrolytic capacitor using the film-forming device 100 is described.

(Film-Forming Device)

As shown in FIG. 1, the film-forming device 100 is a roll-to-roll method film-forming device. The film-forming device 100 includes a chamber 101, a first to sixth rollers 111 to 116, and a control unit 120.

In the chamber 101, a film-forming region 102 is formed. The film-forming region 102 has a first supply zone SZ1, a first exhaust zone EZ1, a second supply zone SZ2, and a second exhaust zone EZ2. Each zone is disposed in this order, so as to separate the chamber 101 in a direction crossing the conveying direction. The number and arrangement of the supply zone and exhaust zone can be designed freely.

In the first supply zone SZ1, a first gas G1 is supplied through a first supply port 103. In the first exhaust zone EZ1, an inert gas G3 (e.g., nitrogen gas) is supplied through a third supply port 105, and the first gas G1 is exhausted through a first outlet 106. In the second supply zone SZ2, a second gas G2 is supplied through the second supply port 104. In the second exhaust zone EZ2, an inert gas G3 is supplied through a third supply port 105, and the second gas G2 is exhausted through the second outlet 107.

The first roller 111 is a supplying roller that supplies a film-formation target, i.e., a metal foil 200. The first roller 111 is disposed outside the chamber 101. The metal foil 200 before film formation supplied from the first roller 111 is conveyed to the film-forming region 102 via a second roller 112 and a third roller 113 disposed in the chamber 101.

Figure 2:
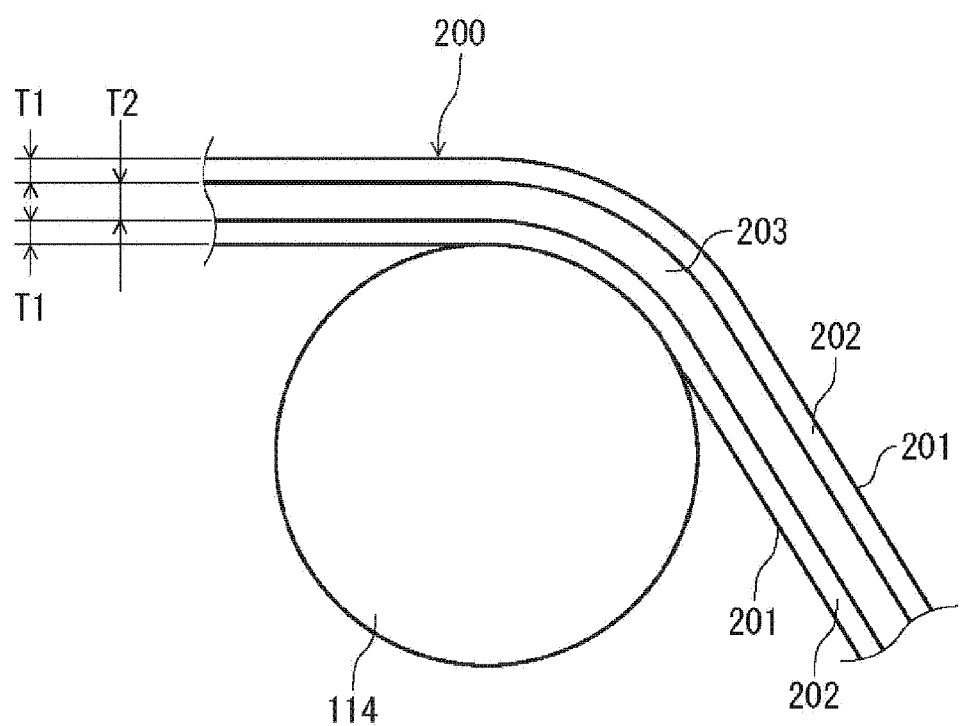
FIG. 2 is a front view schematically illustrating a fourth roller and a metal foil.

In the film-forming region 102, a film is formed on the metal foil 200 (ref: FIG. 2) having a porous portion 202 on a main surface 201 by an atomic layer deposition method. The metal foil 200 may have a core part 203 continuous to the porous portion 202. The porous portion 202 is formed on the main surface 201 of the metal foil 200 by, for example, etching. The core part 203 is, for example, a region not subjected to etching. Preferably, the porous portion 202 has a thickness T1 of 5 μm or more, and more preferably 20 μm or more. Preferably, the core part 203 has a thickness T2 of 10 μm or more, and when the metal foil 200 is used for a wound type capacitor, it is preferably 15 μm or more.

To be specific, in the first supply zone SZ1, the first gas G1 makes contact with the both main surfaces 201 of the metal foil 200 to allow molecules including the second metal to adhere to the both main surfaces 201. Afterwards, in the first exhaust zone EZ1, the first gas G1 is exhausted.

Then, in the second supply zone SZ2, the second gas G2 makes contact with both main surfaces 201 of the metal foil 200, which generates an oxide of the second metal adhered to the both main surfaces 201. As a result, a film (dielectric layer) including the oxide of the second metal is formed on both main surfaces 201 of the metal foil 200. Preferably, the film has a thickness of 2 nm or more. Afterwards, in the second exhaust zone EZ2, the second gas G2 is exhausted.

The film-formed metal foil 200 is drawn from the film-forming region 102 by fourth to sixth rollers 114 to 116 provided downstream of the film-forming region 102. The film-formed metal foil 200 is taken up by the sixth roller 116 disposed outside the chamber 101 via the fourth roller 114 disposed inside the chamber 101 and the fifth roller 115 disposed outside the chamber 101. The sixth roller 116 is a take-up roller that takes up the film-formed metal foil 200. The fourth to sixth rollers 114 to 116 are each an example of a conveyor.

The shape of the first to sixth rollers 111 to 116 is not particularly limited, and may be, for example, a drum-like, helical, etc. The material of the first to sixth rollers 111 to 116 may be resin or rubber. The type of the first to sixth rollers 111 to 116 may be the same or different.

The control unit 120 controls the stress applied to the metal foil 200 from the fourth to sixth rollers 114 to 116 to 21 N/mm$^2$ or less. The control unit 120 of this embodiment controls the stress by controlling the driving torque of a motor (not shown) included in the sixth roller 116. The control unit 120 includes an arithmetic logic unit and a memory storing a program executable by the arithmetic logic unit.

Preferably, the control unit 120 controls the stress applied to the metal foil 200 from the fourth to sixth rollers 114 to 116 to 12 N/mm$^2$ or less, and more preferably to 7 N/mm$^2$ or less.

Preferably, the first to sixth rollers 111 to 116 have a diameter of 30 mm or more. Preferably, for example, when the porous portion 202 has a thickness of 20 μm or more, the rollers 111 to 116 have a diameter of 50 mm or more. Preferably, when the film thickness is, for example, 7 nm or more, the rollers 111 to 116 have a diameter of 50 mm or more. Preferably, the diameter of rollers 111 to 116 increase as they approach the take-up side (downstream). Preferably, the take-up roller, i.e., sixth roller 116, has a diameter of, for example, 70 mm or more. This is because when the porous portion 202 has a thickness of 20 μm or more, the amount of film formed on the porous portion 202 increases, and when the roller diameter is too small, it may cause defects such as cracks or voids easily.

(Method for Producing Electrolytic Capacitor)

The method for producing an electrolytic capacitor (first method for producing electrolytic capacitor) of this embodiment includes a preparing step, a film-forming step, an electrolyte layer forming step, a capacitor element forming step, and a sealing step.

In the preparing step, a metal foil 200 having a porous portion 202 on a main surface 201 is prepared.

In the film-forming step, using the film-forming device 100 of this embodiment, a film (dielectric layer) is formed on the metal foil 200. In this manner, an electrode foil (anode foil) for an electrolytic capacitor is obtained.

In the electrolyte layer forming step, a solid electrolyte layer covering at least a portion of the film of the anode foil is formed. The solid electrolyte layer may include a conductive polymer, and as necessary, a dopant and additive may be included.

In the capacitor element forming step, a cathode layer (carbon layer or silver paste layer, etc.) covering at least a portion of the solid electrolyte layer is formed to obtain the capacitor element.

In the sealing step, the capacitor element is sealed by, for example, a sealing member such as epoxy resin, so as to expose a portion of the anode terminal and cathode terminal electrically connected to the capacitor element.

Through the known plurality of steps described above, an electrolytic capacitor (solid electrolytic capacitor) can be produced.

In the anode foil of the present disclosure, the dielectric layer has fewer defects such as cracks, and therefore even when a solid electrolyte layer is formed on the dielectric layer, an increase in leak current in an electrolytic capacitor can be suppressed. Furthermore, with a physical load generated at the time of forming the sealing member, even when a load is generated on the dielectric layer, an increase in the leak current can be suppressed.

Another method for producing an electrolytic capacitor (second method for producing electrolytic capacitor) includes a preparing step, a film-forming step, a capacitor element forming step, an electrolyte forming step, and a sealing step.

The preparing step and film-forming step are the same as those in the above-described first method for producing an electrolytic capacitor.

In the capacitor element forming step, an electrode foil (anode foil), a separator, and a cathode foil are stacked, and then wound to form a capacitor element.

In the electrolyte layer forming step, the capacitor element is immersed in an electrolyte. For the electrolyte, a liquid electrolyte and solid electrolyte can be used.

In the sealing step, the capacitor element is accommodated in a case of, for example, metal, and sealed with a sealing body such as rubber, with the anode terminal and cathode terminal being drawn out.

With the steps above, a second electrolytic capacitor can be produced.

In this case as well, in the anode foil of the present disclosure, the dielectric layer has fewer defects such as cracks, and therefore even when the capacitor element is immersed in the electrolyte, and the dielectric layer made contact with the electrolyte (particularly solid electrolyte), an increase in the leak current in the electrolytic capacitor can be suppressed. Furthermore, in the anode foil of this embodiment, the dielectric layer has fewer defects, and therefore when forming a capacitor element by winding, deeper cracks may not be generated easily in the dielectric layer, and an increase in the leak current can be suppressed.

Still another method for producing an electrolytic capacitor (third method for producing electrolytic capacitor) includes a preparing step, a film-forming step, a capacitor element forming step, an electrolyte forming step, and a sealing step.

Other than the film-forming step and capacitor element forming step, the steps are the same as the above-described second method for producing an electrolytic capacitor.

In the film-forming step, using the film-forming device 100 of this embodiment, a film (dielectric layer or conductive layer) is formed on the metal foil 200. In this manner, an electrode foil (cathode foil) for an electrolytic capacitor is produced.

In the capacitor element forming step, the anode foil, a separator, and an electrode foil (cathode foil) are stacked, and then wound to form a capacitor element.

With the steps above, a third electrolytic capacitor can be produced.

In this case as well, in the cathode foil of the present disclosure, the dielectric layer or conductive layer have fewer defects such as cracks, and therefore separation of the dielectric layer or conductive layer from the metal foil, and an increase in an equivalent series resistance can be suppressed. This effect can be further improved when a solid electrolyte such as a conductive polymer is formed on the dielectric layer or electrode layer.

Preferably, when a film is formed on the cathode, a thin and uniform film is formed. When the technique of the present disclosure is used for a cathode, a thin film can be formed uniformly with fewer defects compared with the case where the film is formed by a liquid phase anodization method, and therefore a capacitor with a higher electrostatic capacitance and smaller leak current can be produced.

Other than the above-described electrolytic capacitor, the electrode foil of the present disclosure can be used for electrode foils for various electrolytic capacitors, such as an electrolytic capacitor with a structure in which the anode foil and cathode foil are stacked.

Embodiment 2

A film-forming device 100 of Embodiment 2 is described. The film-forming device 100 of this embodiment is different from the above-described Embodiment 1 in terms of a control target of the control unit 120. In the following, different points from the above-described Embodiment 1 are mainly described.

Figure 3:
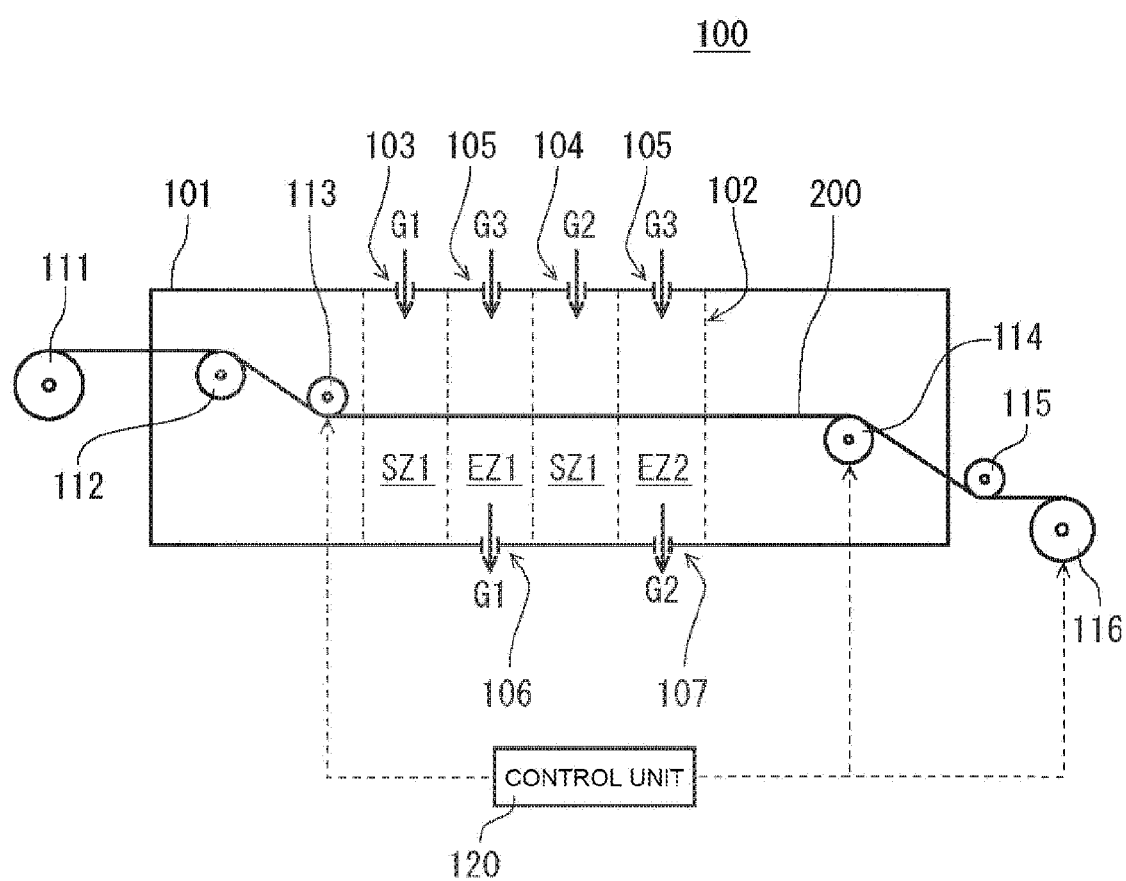
FIG. 3 is a front view schematically illustrating a film-forming device of Embodiment 2.

As shown in FIG. 3, the control unit 120 controls the stress applied to the metal foil 200 from the third roller 113, fourth roller 114, and sixth roller 116 to 21 N/mm$^2$ or less. The control unit 120 of this embodiment controls the stress by controlling the driving torque of a motor (not shown) included in each of the third roller 113, fourth roller 114, and sixth roller 116.

Preferably, the control unit 120 controls the respective rollers 113, 114, and 116 so that the stress applied to the metal foil 200 from them increases in the order of the fourth roller 114, third roller 113, and sixth roller 116. In this case, the stress applied to the metal foil 200 from the fourth roller 114 is the maximum stress, and this is controlled to be 21 N/mm² or less. In this manner, loosening of the metal foil 200 in the film-forming region 102 is suppressed, while the stress applied to the metal foil 200 is suppressed to a minimum necessary stress.

In this embodiment, in the film-forming region 102, the metal foil 200 may swing by spraying of a first gas or second gas to the metal foil 200 through the first supply port 103, second supply port 104, third supply port 105, first outlet 106, and second outlet 107, or by the flow of these gasses, and therefore to suppress the swing, a roller, which is not shown, may be suitably added between the third roller 113 and fourth roller 114.

In particular, when the metal foil 200 having a porous portion 202 passed through the film-forming region 102 and the film formation is completed, compared with a flat substrate, many films are densely produced at the porous portion 202. Preferably, when the metal foil 200 is used for an electrolytic capacitor, the stress applied to a produced film is made small as much as possible, so that cracks or voids are not generated as much as possible. For example, the stress applied to the metal foil 200 from the fourth roller 114 is controlled to 21 N/mm² or less so as not to swing the metal foil 200 at the time of film formation, and the stress applied to the metal foil 200 after the film formation from the sixth roller 116 is controlled to 12 N/mm² or less, so that the produced film can be taken up without applying the stress as much as possible.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present disclosure can be used for a film-forming device, a method for producing an electrode foil for an electrolytic capacitor, and a method for producing an electrolytic capacitor.

DESCRIPTION OF REFERENCE NUMERALS

100: film-forming device
  101: chamber
    102: film-forming region
      SZ1: first supply zone
      SZ2: second supply zone
      EZ1: first exhaust zone
      EZ2: second exhaust zone
  103: first supply port
  104: second supply port
  105: third supply port
  106: first outlet
  107: second outlet
  111: first roller
  112: second roller
  113: third roller
  114: fourth roller (conveyor)
  115: fifth roller (conveyor)
  116: sixth roller (conveyor)
  120: control unit
200: metal foil
  201: main surface
  202: porous portion
  203: core part
    G1: first gas
    G2: second gas
    G3: inert gas
    T1: porous portion thickness
    T2: core part thickness

The invention claimed is:

1. A film-forming device for forming a film on a metal foil used for producing an electrode foil for an electrolytic capacitor, having a porous portion on a main surface thereof by a gas phase method, the film-forming device comprising:
a film-forming region in which the film is formed on the metal foil;
a conveyor provided downstream of the film-forming region and drawing the metal foil from the film-forming region; and
a control unit that controls a stress applied to the metal foil from the conveyor to 21 N/mm² or less,
wherein the conveyor includes a plurality of rollers,
the plurality of rollers include a first roller that is disposed closest to the film-forming region among the plurality of rollers, and a second roller that is a take-up roller,
the plurality of rollers have a diameter of 50 mm or more,
the second roller has a diameter of 70 mm or more,
the porous portion has a thickness of 20 μm or more, and
the film has a thickness of 7 nm or more.

2. The film-forming device of claim 1, wherein the metal foil has a core part continuous to the porous portion, and
the core part has a thickness of 10 μm or more.

3. The film-forming device of claim 1, wherein the film includes a dielectric.

4. The film-forming device of claim 1, wherein the conveyor is a columnar or cylindrical roller.

5. The film-forming device of claim 1, wherein the gas phase method is an atomic layer deposition method.

6. The film-forming device of claim 1, wherein:
the stress applied to the metal foil from the first roller is higher than the stress applied to the metal foil from the second roller.

7. A method for producing an electrode foil for an electrolytic capacitor, the method including:
a step of preparing a metal foil having a porous portion on a main surface thereof;
a step of forming a film on the metal foil in a film forming region of a film forming device; and
a step of drawing the metal foil from the film forming region by a conveyor provided downstream of the film-forming region, wherein:
a stress applied to the metal foil from the conveyor is 21 N/mm² or less,
the conveyor includes a plurality of rollers,
the plurality of rollers include a first roller that is disposed closest to the film-forming region among the plurality of rollers, and a second roller that is a take-up roller,
the plurality of rollers have a diameter of 50 mm or more,
the second roller has a diameter of 70 mm or more,
the porous portion has a thickness of 20 μm or more, and
the film has a thickness of 7 nm or more.

8. The method of claim 7, wherein the metal foil has a core part continuous to the porous portion, and
the core part has a thickness of 10 μm or more.

9. The method of claim 7, wherein the film includes a dielectric.

10. A method for producing an electrolytic capacitor, the method comprising:
- a step of preparing a metal foil having a porous portion on a main surface thereof;
- a step of forming a film on the metal foil in a film forming region of a film forming device to obtain an electrode foil;
- a step of drawing the metal foil from the film forming region by a conveyor provided downstream of the film-forming region; and
- a step of forming a solid electrolyte layer covering at least a portion of the film, wherein:
- a stress applied to the metal foil from the conveyor is 21 N/mm$^2$ or less,
- the conveyor includes a plurality of rollers,
- the plurality of rollers include a first roller that is disposed closest to the film-forming region among the plurality of rollers, and a second roller that is a take-up roller,
- the plurality of rollers have a diameter of 50 mm or more,
- the second roller has a diameter of 70 mm or more,
- the porous portion has a thickness of 20 μm or more, and
- the film has a thickness of 7 nm or more.

11. The method of claim 10, wherein the metal foil has a core part continuous to the porous portion, and
- the core part has a thickness of 10 μm or more.

12. The method of claim 10, wherein the film includes a dielectric.

* * * * *